(12) United States Patent
Ishikawa

(10) Patent No.: US 9,703,147 B2
(45) Date of Patent: Jul. 11, 2017

(54) LIQUID CRYSTAL DISPLAY DEVICE AND MOTHERBOARD

(71) Applicant: Japan Display Inc., Tokyo (JP)

(72) Inventor: Tomokazu Ishikawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 19 days.

(21) Appl. No.: 14/850,418

(22) Filed: Sep. 10, 2015

(65) Prior Publication Data

US 2016/0070127 A1    Mar. 10, 2016

(30) Foreign Application Priority Data

Sep. 10, 2014    (JP) ................ 2014-184208

(51) Int. Cl.
| | |
|---|---|
| *G02F 1/1339* | (2006.01) |
| *G02F 1/01* | (2006.01) |
| *G02F 1/161* | (2006.01) |
| *G02F 1/1333* | (2006.01) |
| *G02F 1/1341* | (2006.01) |

(52) U.S. Cl.
CPC .......... *G02F 1/1339* (2013.01); *G02F 1/0107* (2013.01); *G02F 1/13394* (2013.01); *G02F 1/161* (2013.01); *G02F 1/133351* (2013.01); *G02F 2001/13415* (2013.01)

(58) Field of Classification Search
CPC ............. G02F 1/133351; G02F 1/0107; G02F 1/1339; G02F 1/161
See application file for complete search history.

(56) References Cited

U.S. PATENT DOCUMENTS

| | | | |
|---|---|---|---|
| 2005/0078267 A1 | 4/2005 | Motomatsu | |
| 2010/0326592 A1* | 12/2010 | Ishitani | G02F 1/1341 156/250 |
| 2011/0075090 A1* | 3/2011 | Shigekura | G02F 1/133351 349/153 |
| 2012/0194756 A1* | 8/2012 | Hayakawa | G02F 1/1339 349/43 |
| 2015/0160497 A1* | 6/2015 | Sonoda | G02F 1/13394 349/153 |
| 2015/0177557 A1* | 6/2015 | Chang | G02F 1/1339 349/122 |
| 2015/0185539 A1* | 7/2015 | Senokuchi | H05B 33/04 349/58 |

FOREIGN PATENT DOCUMENTS

JP       2005-115155 A       4/2005

* cited by examiner

*Primary Examiner* — Kendrick Hsu
(74) *Attorney, Agent, or Firm* — Typha IP LLC

(57) ABSTRACT

A liquid crystal display device filled with a liquid crystal according to one drop filling prevents the liquid crystal from penetrating between a sealant and a TFT substrate or a counter substrate so as to reduce bonding strength in a seal part. The seal part has a wall spacer around the periphery of the sealant. In a terminal-side seal part, a second sealant is formed outside the wall spacer while a second wall spacer is formed outside the second sealant. Thus, the sealant, the wall spacer, and the sealant are sequentially formed in a plan view of a motherboard including liquid crystal display panels to be separated. This configuration can prevent the liquid crystal from penetrating into the seal part according to an internal pressure.

8 Claims, 18 Drawing Sheets

B-B

LIQUID CRYSTAL DISPLAY DEVICE AND MOTHERBOARD

CLAIM OF PRIORITY

The present application claims priority from Japanese Patent Application JP 2014-184208 filed on Sep. 10, 2014, the content of which is hereby incorporated by reference into this application.

FIELD OF THE INVENTION

The present invention relates to a liquid crystal display device and particularly relates to a liquid crystal display device including a seal part with reliability improved in the case where a frame region surrounding a display region is reduced in width.

DESCRIPTION OF THE RELATED ART

A liquid crystal display device includes a TFT substrate on which pixel electrodes and thin-film transistors (TFTs) or the like are formed in a matrix form, and a counter substrate opposed to the TFT substrate with a liquid crystal interposed between the TFT substrate and the counter substrate. An image is formed by controlling the light transmittance of liquid crystal molecules for each pixel.

In the liquid crystal display device, a region surrounded by the TFT substrate, the counter substrate, and a sealant around the substrates contains liquid crystals. Liquid crystals may be injected into the space from an inlet or may be applied so as to be dropped (ODF) onto the TFT substrate or the counter substrate before the TFT substrate and the counter substrate are bonded to each other.

ODF (one drop filling) enables high-speed injection of liquid crystals and thus has been frequently used. One drop filling needs accurate control of a quantity of a dropped liquid crystal. In the bonding of the TFT substrate and the counter substrate, however, the substrates are likely to be irregularly spaced particularly on a seal part. In Japanese Patent Laid-Open No. 2005-115155, an inner first sealant and an outer second sealant are spaced at a certain interval in order to prevent substrates from being irregularly spaced according to one drop filling. A clearance a between a liquid-crystal dropping position and the first sealant is 2.5 to 5 times larger than a clearance b between the first sealant and the second sealant.

Liquid crystal display devices with maximized display regions in fixed outside shapes have grown in demand. Such a configuration has a small width from one end of a display region to the outside shape of a liquid crystal display panel, that is, a so-called frame region is small. In a small liquid crystal display device, the width of a frame region is reduced to about 1 mm. In this case, a sealant for bonding a TFT substrate and a counter substrate is reduced in width and thus disadvantageously decreases in reliability.

Additionally, in one drop filling, the sealant is semi-cured when a liquid crystal is dropped. Thus, if a large pressure is applied to a region filled with the liquid crystal between the TFT substrate and the counter substrate, the liquid crystal may penetrate between the sealant and the TFT substrate or the counter substrate so as to reduce the reliability of the sealant.

An object of the present invention is to achieve a liquid crystal display device that can keep the reliability of a sealant even if a liquid crystal is applied with a smaller frame region and the sealant is reduced in width according to one drop filling.

SUMMARY OF THE INVENTION

The present invention has been devised to solve the foregoing problems. Specific measures will be discussed below.

(1) A liquid crystal display device including a TFT substrate having a display region and a terminal portion, a counter substrate having a display region, a sealant formed in a seal part so as to bond the TFT substrate and the counter substrate, and a liquid crystal sealed inside the seal part, the seal part having a first wall spacer around the display region and the sealant, the first wall spacer regulating a clearance between the TFT substrate and the counter substrate.

(2) The liquid crystal display device according to (1), wherein the seal part includes a terminal-side seal part and the other seal part, the terminal-side seal part includes a second sealant formed outside the first wall spacer and a second wall spacer formed outside the second sealant, and the counter substrate has an end outside the second wall spacer.

(3) The liquid crystal display device according to (2) further includes a scribing columnar spacer between the end of the counter substrate and the second wall spacer.

(4) The liquid crystal display device according to (1), wherein the first wall spacer has an inner corner that is rounded with a curvature radius of at least 0.3 mm, more preferably a curvature radius of at least 0.5 mm.

(5) A motherboard having a plurality of liquid crystal display panels, each including a TFT substrate having a display region and a terminal portion, a counter substrate having a display region, a sealant that bonds the TFT substrate and the counter substrate, and a liquid crystal sealed inside the sealant, the display region being surrounded by a seal part in the liquid crystal display panel, the seal part having a first wall spacer that surrounds the display region and the sealant, the first wall spacer regulating a clearance between the TFT substrate and the counter substrate, the liquid crystal display panel further including a second sealant formed in contact with the first wall spacer so as to surround the plurality of liquid crystal display panels.

(6) The motherboard according to (5), wherein the seal part includes a terminal-side seal part and the other seal part, the terminal-side seal part including a second wall spacer formed outside the second sealant.

(7) The motherboard according to (5) further includes a motherboard sealant formed outside the first sealant.

According to the present invention, the liquid crystal display device filled with a liquid crystal according to one drop filling can prevent the liquid crystal from penetrating between the sealant and the TFT substrate or the counter substrate, thereby improving the reliability of the seal part. Thus, the liquid crystal display device can have a small frame region, that is, a large display region.

DETAILED DESCRIPTION OF THE INVENTION

Separate formation of liquid crystal display panels leads to low efficiency and thus multiple liquid crystal display panels are formed on a single motherboard and then the completed motherboard is divided into the individual liquid crystal display panels. In the division into the individual liquid crystal display panels, a sealant on a break line may lead to difficulty in dividing the motherboard by scribing and so on. Thus, the sealant is not formed on a part of the break line. This method however needs a relatively wide sealant-free part on both sides of the break line in order to prevent the sealant from extending to a part of the break line.

Figure 13:
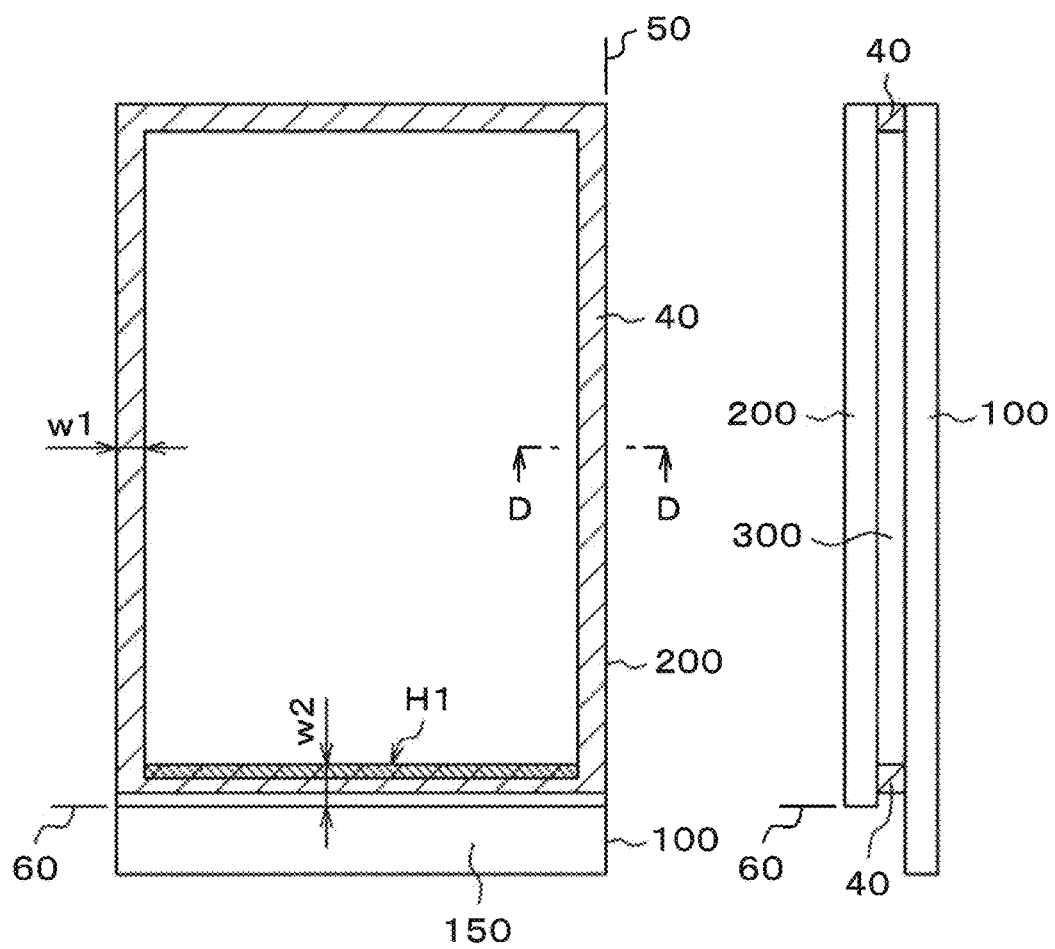
FIG. 13 shows a plan view of a liquid crystal display device as an example of penetration of a liquid crystal.

In a method for preventing this problem, a wall spacer is formed on a part of the break line and then the part of the wall spacer is cut. FIG. 13 shows a plan view and a side view of a liquid crystal display device formed thus. In FIG. 13, a TFT substrate 100 and a counter substrate 200 are bonded to each other with a sealant 40. A liquid crystal 300 is sealed inside the sealant 40. The TFT substrate 100 is larger than the counter substrate 200. A portion where the TFT substrate 100 is formed alone is a terminal portion 150 where an IC driver is mounted or a terminal and the like are formed to be connected to, for example, a flexible printed circuit.

Figure 14:
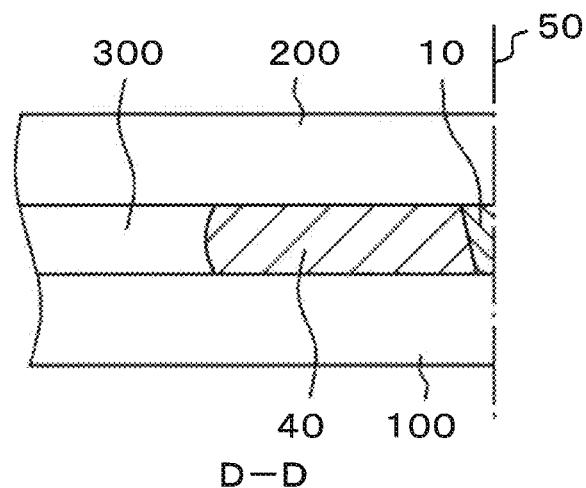
FIG. 14 is a cross-sectional view taken along line D-D of FIG. 3.

FIG. 14 is a cross-sectional view showing a break line 50 taken along line D-D of FIG. 13. In FIG. 13, the TFT substrate 100 and the counter substrate 200 are bonded to each other with the sealant 40 and contain the liquid crystal 300. A wall spacer 10 is formed on the cutting end of the TFT substrate 100 and the counter substrate 200 so as to exclude the sealant in a cutting region. However, on a break line 60 facing the terminal portion 150 in FIG. 13, only the counter substrate is cut but the TFT substrate is uncut because the terminal portion needs to be left. Thus, the portions of the break line 50 and the break line 60 have different configurations.

Figure 15:
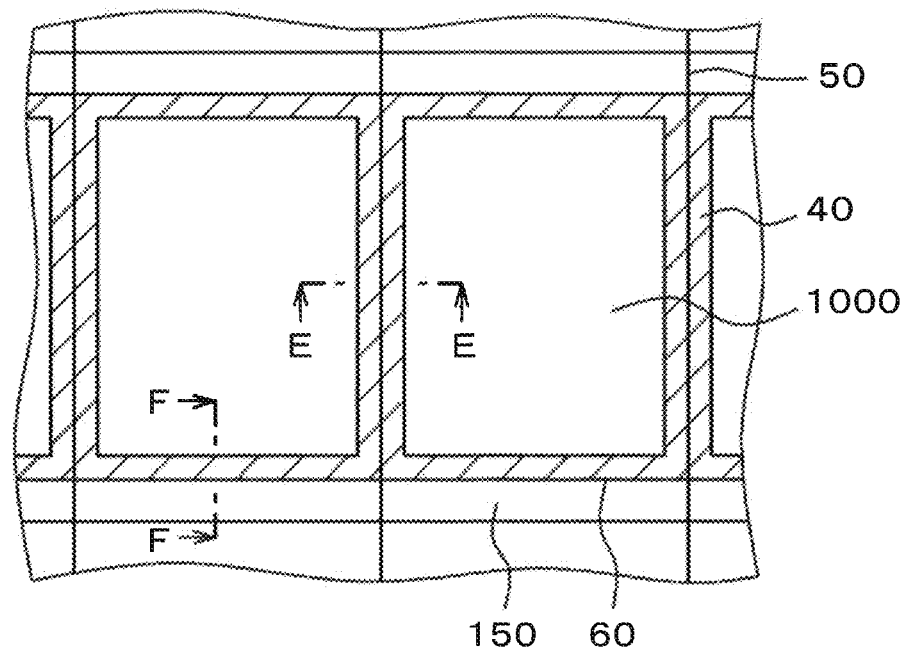
FIG. 15 is a plan view showing an example of the motherboard.
Figure 16:
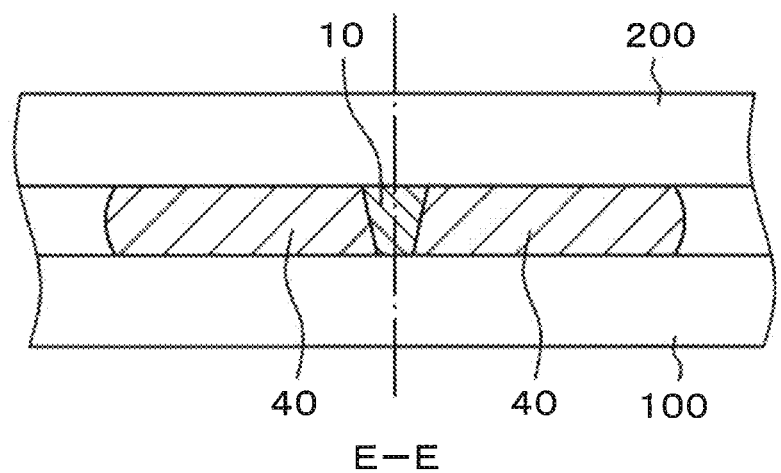
FIG. 16 is a cross-sectional view taken along line E-E of FIG. 15.
Figure 17:
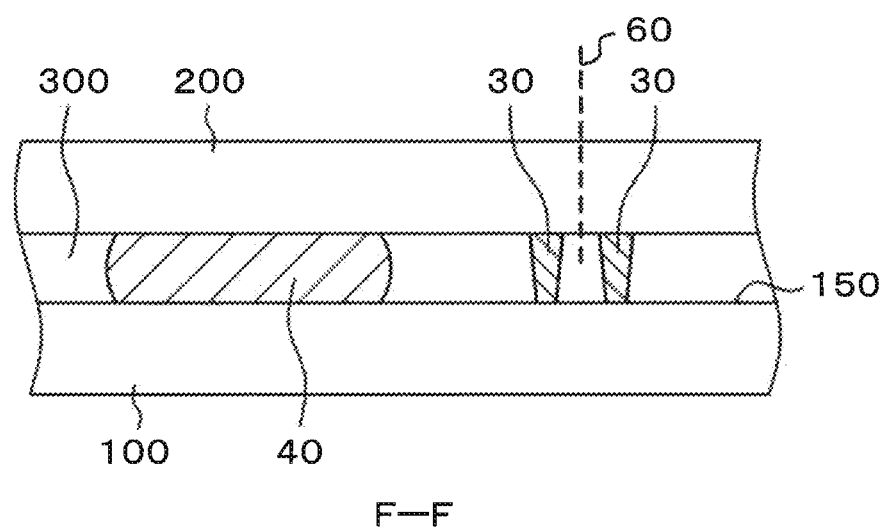
FIG. 17 is a cross-sectional view taken along line F-F of FIG. 16.

FIG. 15 is a plan view showing two liquid crystal display panels arranged on the motherboard. FIG. 16 is a cross-sectional view including the break line 50 of FIG. 15. In FIG. 16, the break line 50 cuts the center of the wall spacer 10. FIG. 17 is a cross-sectional view including the break line 60 of FIG. 15. In FIG. 17, the break line 60 cutting only the counter substrate 200 is located outside the sealant 40.

On the break line 60, the presence of the sealant on the terminal portion makes it difficult to remove the counter substrate opposed to the terminal portion. Thus, the sealant is not provided on one side of the break line 60. In the case of scribing for cutting, deformed glass cannot be properly scribed and thus scribing columnar spacers 30 are disposed on both sides of the break line 60. Moreover, a frame width w1 in a portion other than the terminal portion 150 is set at about 1 mm, whereas a frame width w2 on the terminal portion 150 can be set at about 3 mm. Thus, the terminal portion 150 configured thus does not cause any problems.

In this configuration, a phenomenon of penetration (hereinafter, will be simply called liquid crystal penetration) of the liquid crystal 300 between the sealant 40 and the TFT substrate 100 or the counter substrate 200 appears in a region denoted as H1 in FIG. 13. This is because as shown in FIG. 15, the wall spacer 10 and the sealant 40 of the adjacent liquid crystal display panel are provided on one side of the sealant 40 along a long side of the liquid crystal display panel, whereas the terminal portion 150 does not have the wall spacer 10 or the sealant on the end of the wall spacer. When a liquid crystal is dropped to bond the TFT substrate 100 and the counter substrate 200, the sealant 40 is not cured and a pressure from the liquid crystal moves the sealant 40. This may cause the penetration. Configurations for preventing such a phenomenon are obtained according to the following embodiments.

[First Embodiment]

Figure 1:
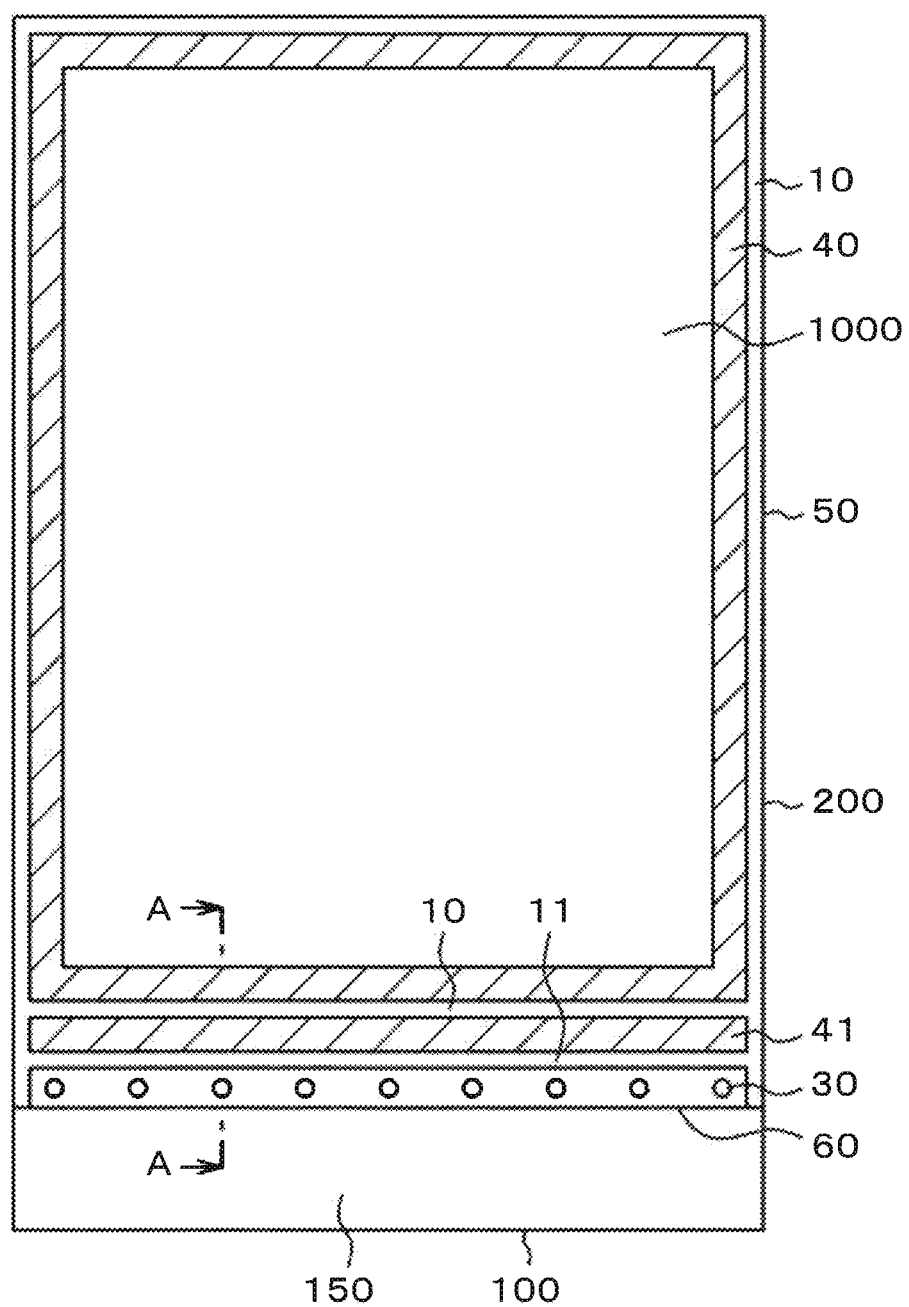
FIG. 1 is a plan view showing a liquid crystal display device of the present invention.

FIG. 1 is a plan view showing a first embodiment of the present invention. In FIG. 1, a TFT substrate 100 and a counter substrate 200 are bonded to each other with a sealant 40. A liquid crystal is interposed between the TFT substrate 100 and the counter substrate 200. In FIG. 1, a wall spacer 10 is provided on the ends of the substrate on three sides other than a terminal portion 150. In the terminal portion 150, the wall spacer 10 is extended outside the sealant 40. Moreover, an outer sealant 41 is provided outside the wall spacer 10 (near the terminal portion). An outer wall spacer 11 is provided to regulate an extension of the outer sealant 41 to the outside. A break line 60 for removing only a part of the counter substrate 200 is provided outside the outer wall spacer 11. The break line 60 corresponds to a scribing location for cutting on the counter substrate 200. Scribing columnar spacers 30 are disposed to prevent deformation of glass at the time of scribing.

Figure 2:
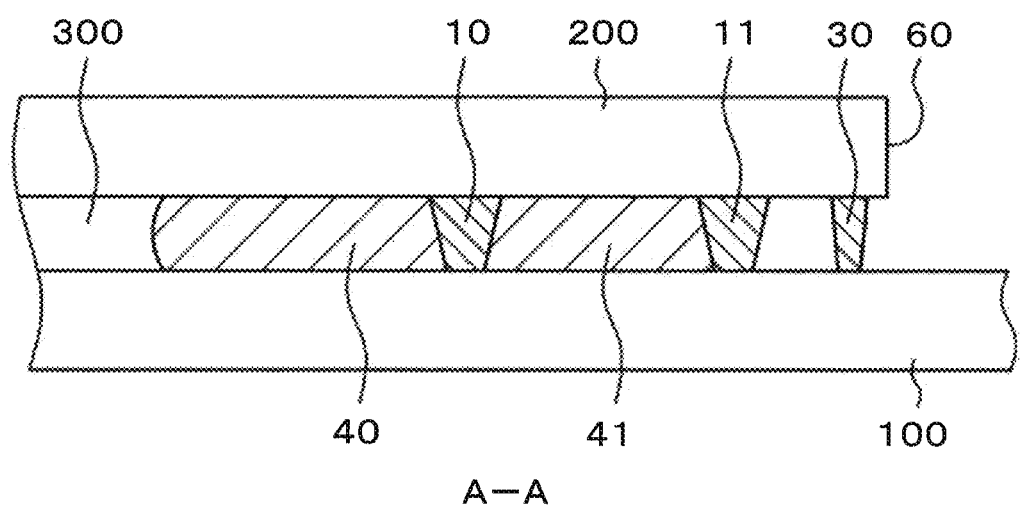
FIG. 2 is a cross-sectional view taken along line A-A of FIG. 1.

FIG. 2 is a cross-sectional view taken along line A-A of FIG. 1. In FIG. 2, a liquid crystal 300 is sealed inside the sealant 40. The wall spacer 10 is provided outside the sealant 40. The outer sealant 41 is provided outside the wall spacer 10 and is blocked by the outer wall spacer 11 provided outside the outer sealant 41. The columnar spacers 30 for preventing deformation in scribing are provided outside of the outer wall spacer 11.

Figure 3:
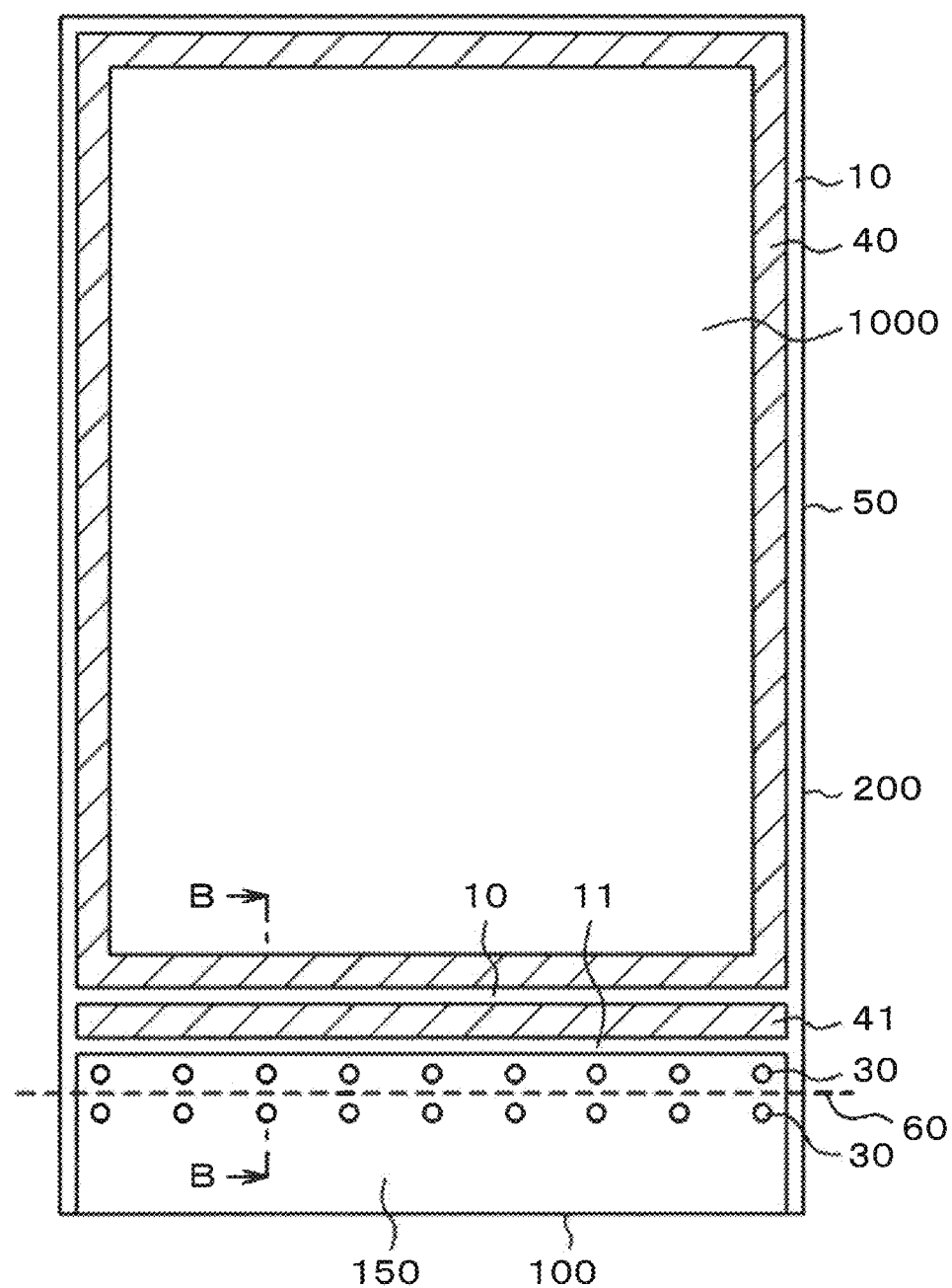
FIG. 3 is a plan view before a counter substrate of a terminal portion is removed in the liquid crystal display device of the present invention.

As shown in FIG. 2, the sealant, the wall spacer, and the sealant are sequentially provided in plan view near the terminal portion 150. With this configuration, even if a pressure is applied from the liquid crystal when the counter substrate 200 and the TFT substrate 100 are bonded to each other, the sealant 40 is blocked and stopped by the wall spacer 10. This prevents the penetration of the liquid crystal. FIG. 3 is a plan view showing a state before the counter substrate 200 opposed to the terminal portion 150 is removed in a liquid crystal display panel. FIG. 3 is different from FIG. 1 in that glass is not divided on the break line 60 indicated by a dotted line. In FIG. 3, the scribing columnar spacers 30 are disposed on both sides of the break line 60. This part does not have the outer sealant 41 because the sealant 41 is blocked by the outer wall spacer 11.

Figure 4:
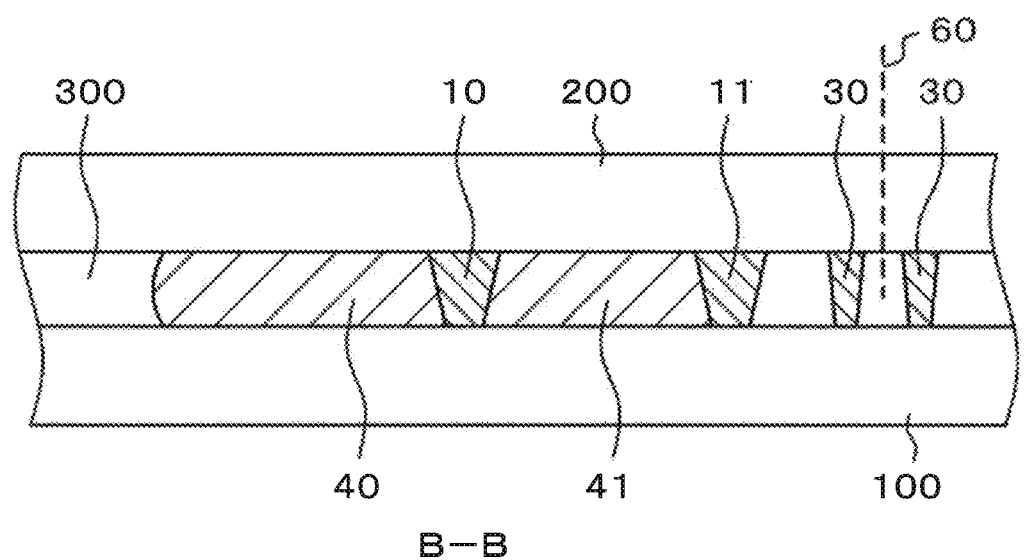
FIG. 4 is a cross-sectional view taken along line B-B of FIG. 3.

FIG. 4 is a cross-sectional view taken along line B-B of FIG. 3. In FIG. 4, the scribing columnar spacers 30 are disposed on both sides of the break line 60. The scribing columnar spacers 30 are provided to prevent deformation of glass during scribing. In FIG. 4, the glass near the counter substrate 200 is removed along the break line 60, obtaining a configuration identical to FIG. 2.

Figure 5:
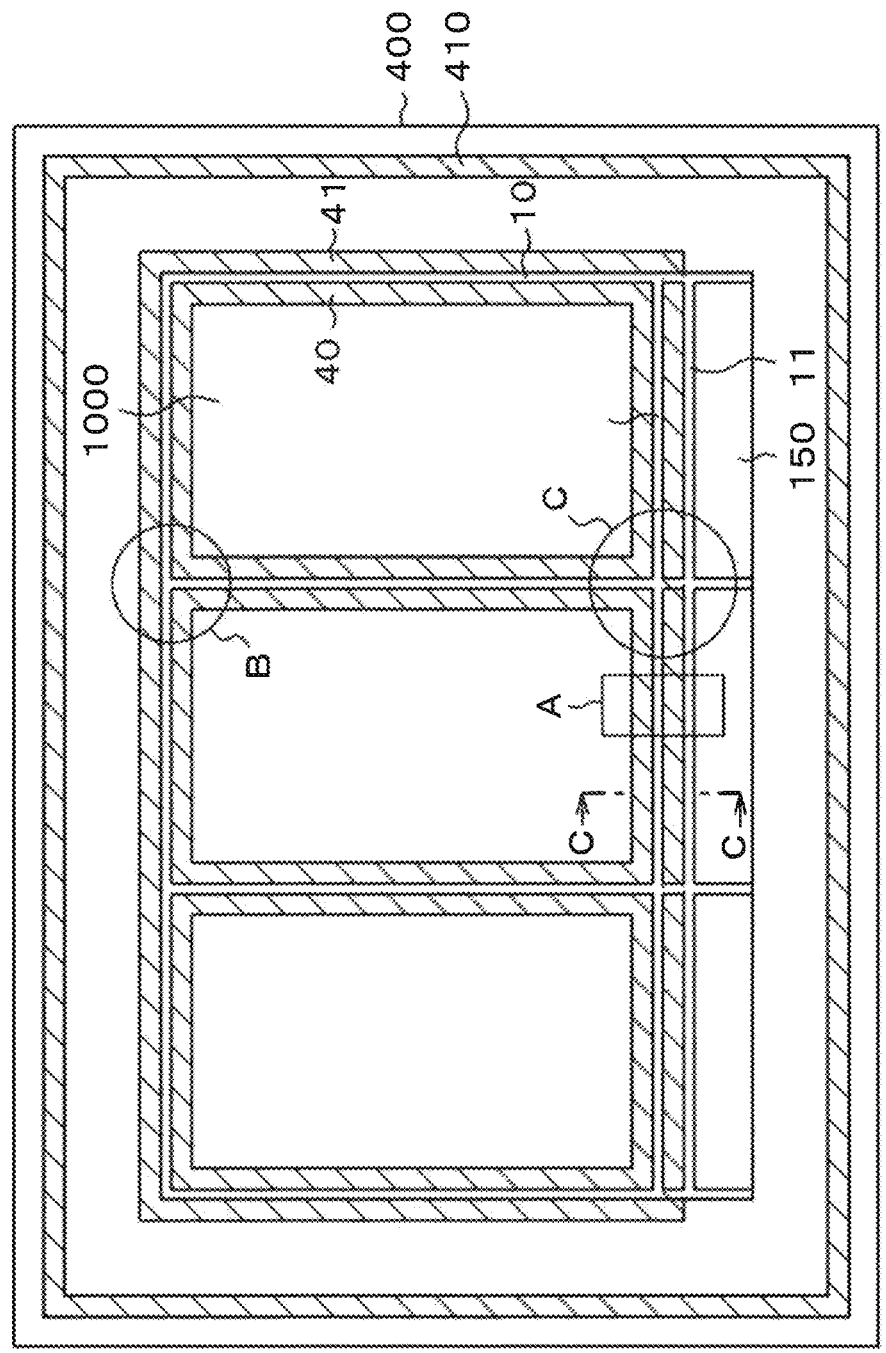
FIG. 5 is a plan view showing a motherboard of the present invention.

FIG. 5 is a plan view showing a motherboard. In FIG. 5, the motherboard has three liquid crystal display panels. The number of liquid crystal display panels is merely exemplary. In many cases, a large number of liquid crystal display panels are formed on the motherboard. In FIG. 5, a motherboard sealant 410 is formed around the three liquid crystal display panels. The motherboard sealant 410 is provided to bond a mother TFT substrate and a mother counter substrate.

The liquid crystal display panels of FIG. 5 each have the sealant 40 surrounding a display region 1000. The wall spacer 10 is formed around the sealant 40. The outer sealant 41 is formed outside the wall spacer 10.

In the terminal portion 150, the outer wall spacer 11 is formed outside the outer sealant 41 to prevent the outer sealant 41 in the terminal portion 150 from excessively extending to the break line 60. The outer wall spacer 11 is not provided in a portion other than the terminal portion 150 because the counter substrate does not need to be separated as in the terminal portion.

As shown in FIG. 5, on all sides surrounding the display region 1000 of the liquid crystal display panel, the sealant, the wall spacer, and the outer sealant are sequentially provided in plan view. This configuration prevents a phenomenon of penetration of the liquid crystal 300 into a seal part on all the sides. Thus, the reliability of the seal part can be obtained on all the sides of the liquid crystal display panel. Other configurations of the liquid crystal display panels in FIG. 5 are identical to those of FIGS. 1 and 3 and so on.

[Second Embodiment]

Figure 6:
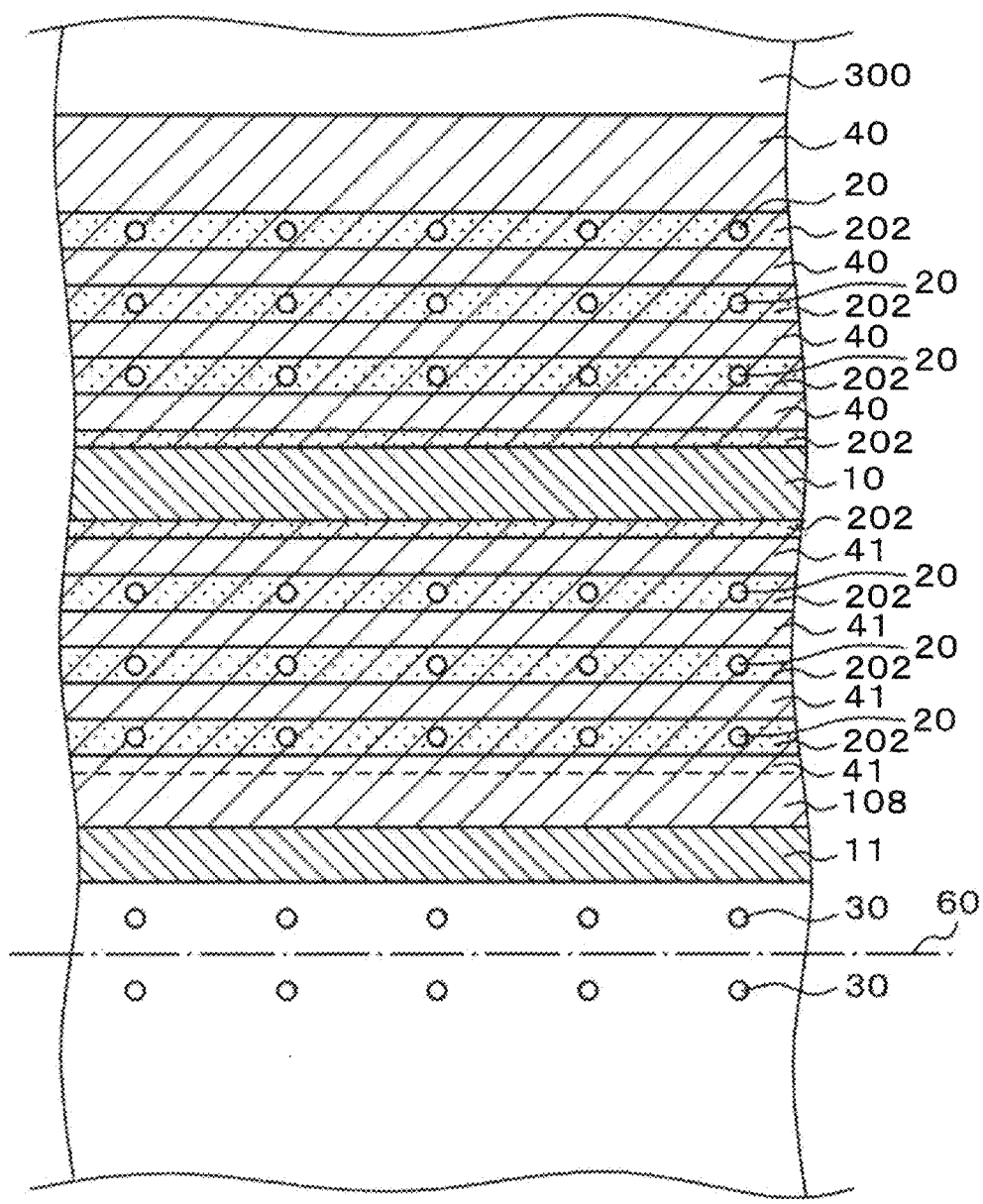
FIG. 6 is an enlarged view showing a region A of FIG. 5.
Figure 7:
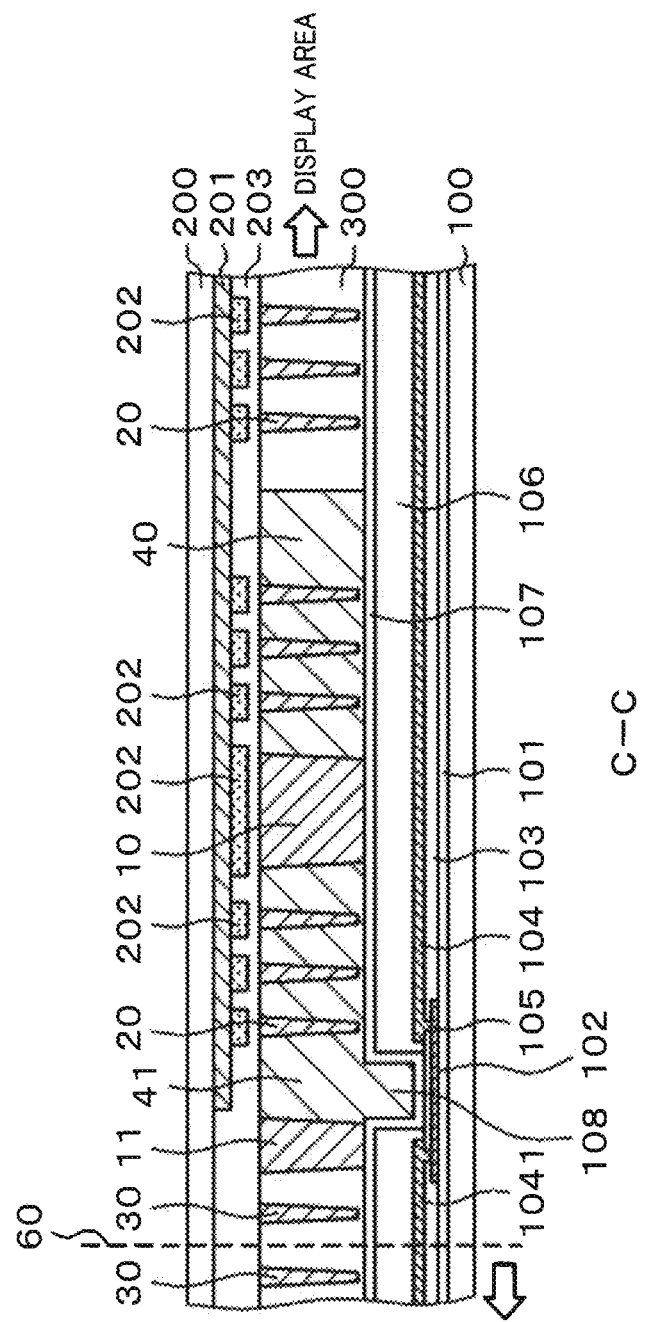
FIG. 7 is a cross-sectional view taken along line C-C of FIG. 5.

In the present embodiment, various configurations are added to the seal part of the terminal portion in each of the liquid crystal display panels shown in FIG. 5. FIG. 6 is a detailed plan view showing a region A of FIG. 5. FIG. 7 is a cross-sectional view taken along line C-C of FIG. 5. In FIG. 6, apart above a wall spacer 10 indicates an inner side while apart under the wall spacer 10 indicates an outer side. In FIG. 6, a liquid crystal 300 is applied on the inner side. A sealant 40 is formed outside the liquid crystal 300. The sealant 40 contains columnar spacers 20 for regulating a clearance between a TFT substrate 100 and a counter substrate 200. The columnar spacers 20 are formed on stripes of a color filter 202 near the counter substrate 200. The columnar spacers 20 are formed in three rows from the inner side. The color filter 202 is composed of, for example, a blue color filter.

In FIG. 6, the wall spacer 10 is formed on the color filter 202 near the counter substrate 200. The columnar spacers 20 in FIG. 6 are disposed to prevent the clearance between the counter substrate 200 and the TFT substrate 100 from being extremely reduced by a pressure applied to the counter substrate 200 from the outside. A small clearance is formed, but not exclusively, between the ends of the columnar spacers 20 and the TFT substrate 100.

In FIG. 6, an outer sealant 41 is formed outside the wall spacer 10. The outer sealant 41 is divided by an outer wall spacer 11. The color filter 202 is formed in stripes near the counter substrate 200 in a portion containing the outer sealant 41, and the columnar spacers 20 are formed on the color filter 202. The color filter 202 in stripes and the columnar spacers 20 are formed in three rows. The color filter 202 is composed of, for example, a blue color filter.

Columnar spacers 30 for preventing deformation in scribing are formed in two rows outside the outer wall spacer 11. A scribing line, that is, a break line 60 is located at a midpoint between the rows of the columnar spacers. In FIG. 6, the outer sealant 41 is separated by the outer wall spacer 11 and thus does not extend to the locations of the scribing columnar spacers 30. This can precisely cut the counter substrate 200 by scribing.

FIG. 7 is a cross-sectional view taken along line C-C of FIG. 5. In FIG. 7, an underlying film 101 is formed on the TFT substrate 100 and a bridge wire 102 is formed thereon. An inorganic insulating film 103 is formed over the underlying film 101 and the bridge wire 102. A wire 104, e.g., a video signal line is formed on the inorganic insulating film 103. An organic passivation film 106 is formed on the wire 104, and an inorganic insulating film 107 made of materials such as SiN is formed thereon.

The organic passivation film 106 has a through hole 108. The through hole on the organic passivation film 106 blocks moisture entering from a terminal portion 150 through the organic passivation film 106. Inside the through hole 108 formed on the organic passivation film 106, the wire 104 is connected to the bridge wire 102 via a contact hole 105 formed on the inorganic insulating film 103. Outside the through hole 108 formed on the organic passivation film 106, the bridge wire 102 is connected to a terminal portion wire 1041 via the contact hole 105 formed on the inorganic insulating film 103. The bridge wire 102 blocks moisture entering from the outside along an interface between the organic passivation film 106 and the terminal portion wire 1041.

On the counter substrate 200, a seal part has a black matrix 201 that is provided to prevent leakage of light from the seal part.

The color filter 202 is formed on the black matrix 201 so as to correspond to the wall spacer 10 or the columnar spacers 20. The color filter 202 is provided to set the columnar spacer 20 and the wall spacers 10 and so on as high as the columnar spacers in a display region 1000. An overcoat film 203 is formed over the color filter 202.

The wall spacer 10, the outer wall spacer 11, the columnar spacers 20, and so on are formed on the overcoat film 203. These spacers made of the same material can be formed using, for example, a halftone mask in the same process or can be separately formed using different masks. The sealant 40 is formed near the display region of the wall spacers 10 while the outer sealant 41 is formed near the terminal portion. The sealant 40 seals a liquid crystal. The wall spacer 10 is provided to prevent the sealant 40 from moving so as to allow penetration of the liquid crystal when the TFT substrate 100 and the counter substrate 200 are bonded to each other. The outer sealant 41 is separated by the outer wall spacer 11.

The scribing columnar spacers 30 for cutting are formed outside the outer wall spacer 11. The break line 60 is located at a midpoint between the two rows of the columnar spacers 30. The outer sealant 41 is separated by the outer wall spacer 11 and thus is not provided on the break line 60, enabling cutting with high accuracy.

The present embodiment can prevent the penetration of a liquid crystal in the seal part, precisely control a clearance between the TFT substrate 100 and the counter substrate 200 in the seal part, and effectively prevent entry of moisture from the outside.

Figure 8:
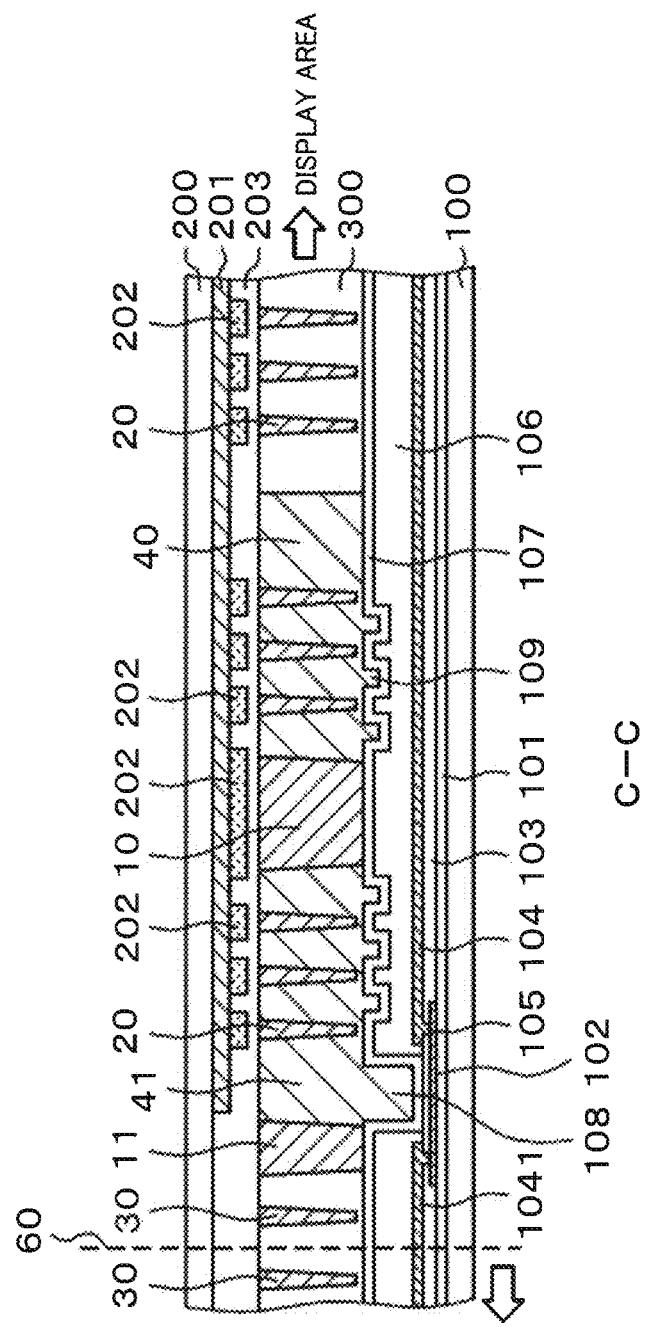
FIG. 8 shows another example of the cross section taken along line C-C of FIG. 5.

FIG. 8 shows another aspect of the present embodiment. FIG. 8 is a cross-sectional view taken along line C-C of FIG. 5. FIG. 8 is different from FIG. 7 in that the organic passivation film 106 has concave portions 109 on the TFT substrate 100. The concave portions 109 are formed between the columnar spacers 30 and between the columnar spacer 30 and the wall spacer 10 on the organic passivation film 106. Even if moisture enters from the outside, the formation of the concave portions 109 can extend the passage of the moisture to the liquid crystal. This can increase the life of the liquid crystal display device, accordingly.

Figure 9:
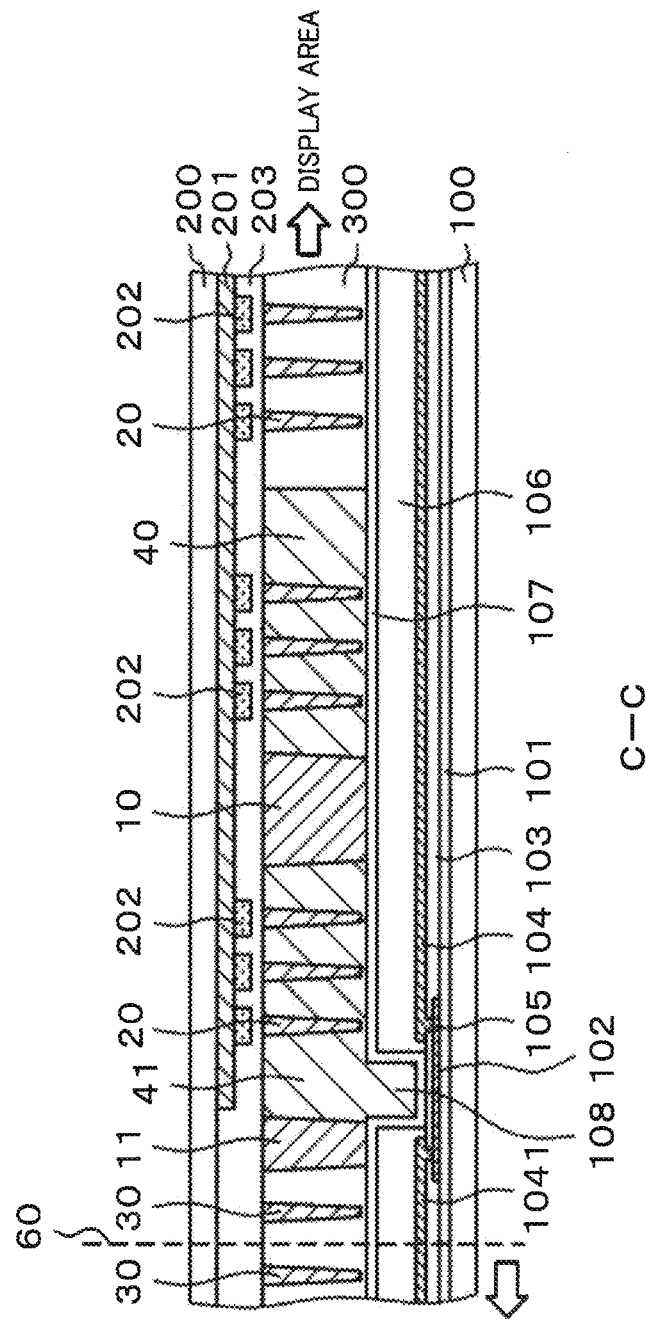
FIG. 9 shows still another example of the cross section taken along line C-C of FIG. 5.

FIG. 9 shows still another aspect of the present embodiment. FIG. 9 is a cross-sectional view taken along line C-C of FIG. 5. FIG. 9 is different from FIG. 7 in that a color filter is not provided in the location of the wall spacer 10 near the counter substrate 200. The wall spacer 10 is wider than the columnar spacer 20 and thus is likely to increase in height in photolithography under the same conditions. Thus, the absence of a color filter in the location of the wall spacer 10 may form spacers of the same height.

Figure 10:
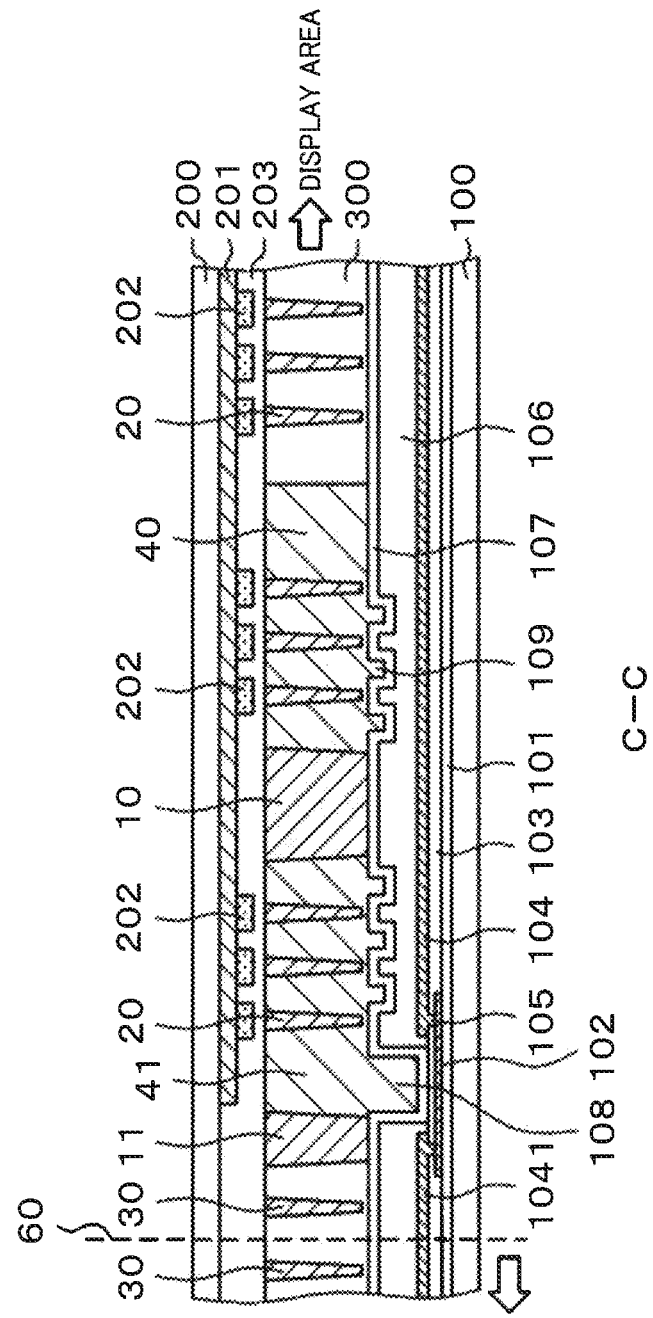
FIG. 10 shows still another example of the cross section taken along line C-C of FIG. 5.

FIG. 10 shows still another aspect of the present embodiment. FIG. 10 is a cross-sectional view taken along line C-C of FIG. 5. FIG. 10 shows a combination of the configurations of FIGS. 8 and 9. Specifically, the formation of the concave portions 109 near the TFT substrate 100 can extend the passage of moisture while a color filter is not formed in the location of the wall spacer 10 near the counter substrate 200. The effects of FIGS. 8 and 9 are combined in FIG. 10.

[Third Embodiment]

In a liquid crystal display device filled with a liquid crystal according to one drop filling, the cause of penetration of the liquid crystal into a seal part may be a movement of a sealant 40 by an internal pressure of the liquid crystal. A wall spacer 10 and the sealant 40 are preferably disposed in contact with each other in order to prevent the sealant 40 from being moved by a pressure of the liquid crystal. Since the sealant 40 is applied by a dispenser or the like, a display region is likely to have round corners. If the wall spacer 10 is square at the corners of the display region, the sealant 40 may not reach the corners. Namely, a clearance between the sealant 40 and the wall spacer 10 may cause a movement of the sealant.

Figure 11:
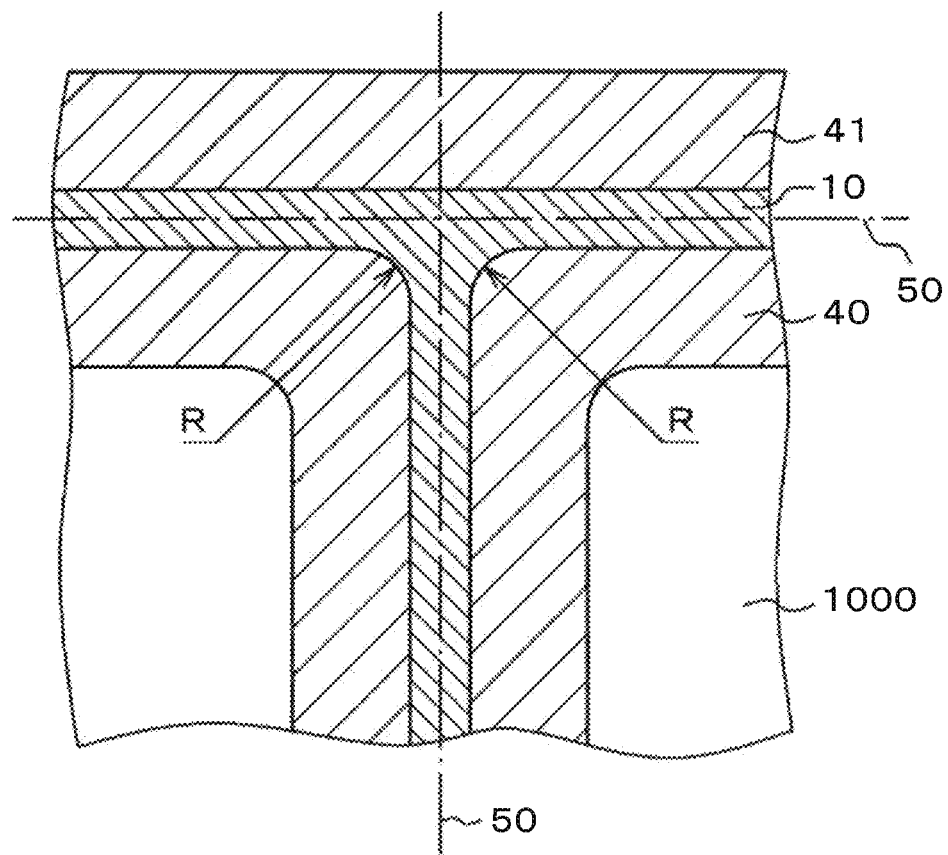
FIG. 11 is a plan view showing a region B of FIG. 5.

In order to prevent this problem in the present embodiment, the inner side of the wall spacer 10 is rounded at the corners of the display region. FIG. 11 is an enlarged plan view showing a region B of FIG. 5. In FIG. 11, the wall spacer 10 has round corners. Thus, the corners of the wall spacer 10 are properly filled with the sealant 40. An extremely small round corner may limit the effect and thus the size of the round corner is desirably at least 0.3 mm and is more desirably at least 0.5 mm.

Figure 12:
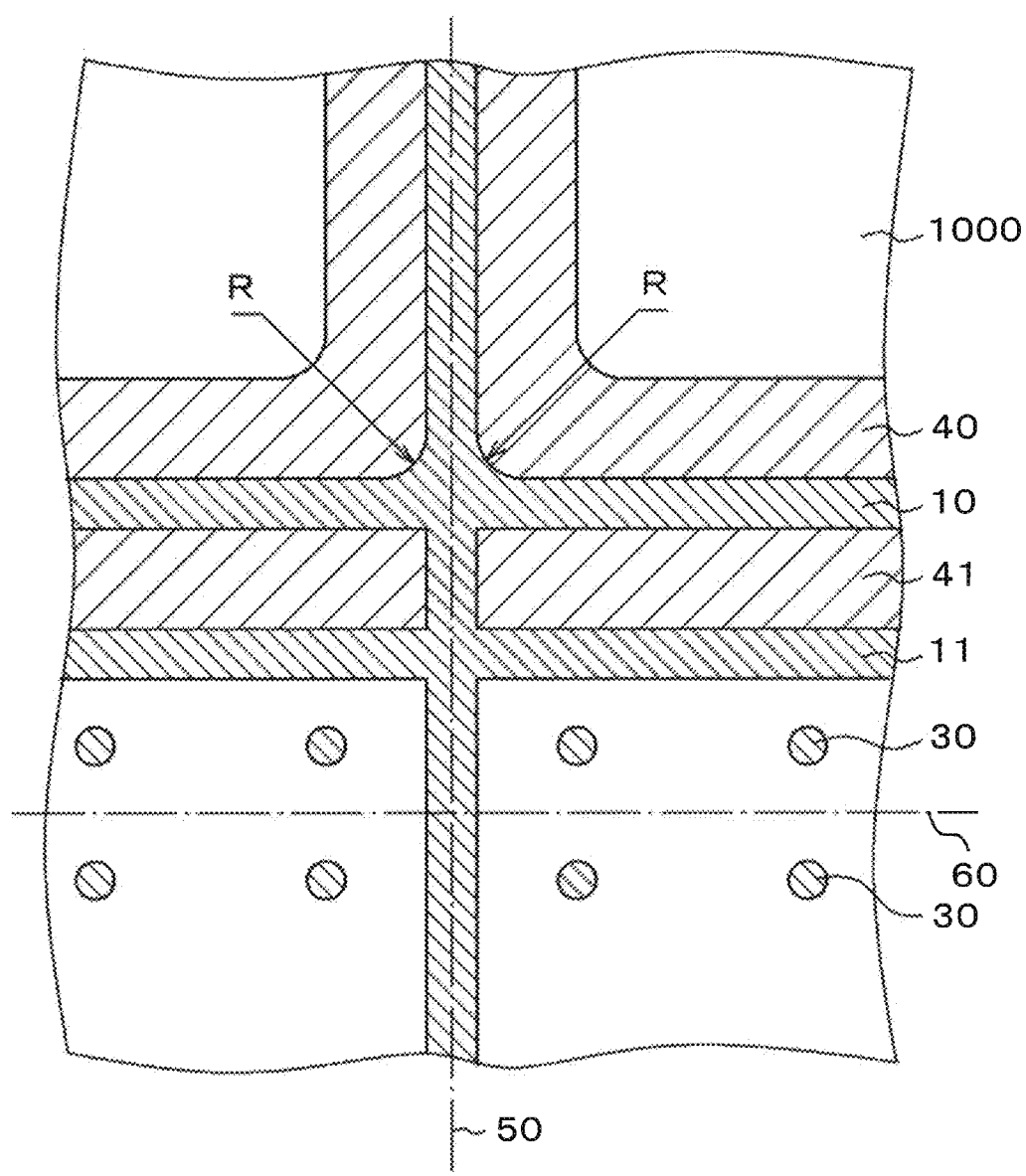
FIG. 12 is a plan view showing a region C of FIG. 5.

FIG. 12 is an enlarged plan view showing a region C of FIG. 5. In FIG. 12, the wall spacer 10 has round corners. Thus, the corners of the wall spacer are properly filled with the sealant 40. Also in this case, an extremely small round corner may limit the effect and thus the size of the round corner is desirably at least 0.5 mm. In FIG. 12, outside the wall spacer 10 where an outer sealant is disposed, the inner square corners of the wall spacer 10 or an outer wall spacer 11 may be rounded.

The present embodiment can suppress a movement of the sealant 40 even at the corners of the display region, thereby preventing penetration of a liquid crystal at the corners of the display region.

Figure 18:
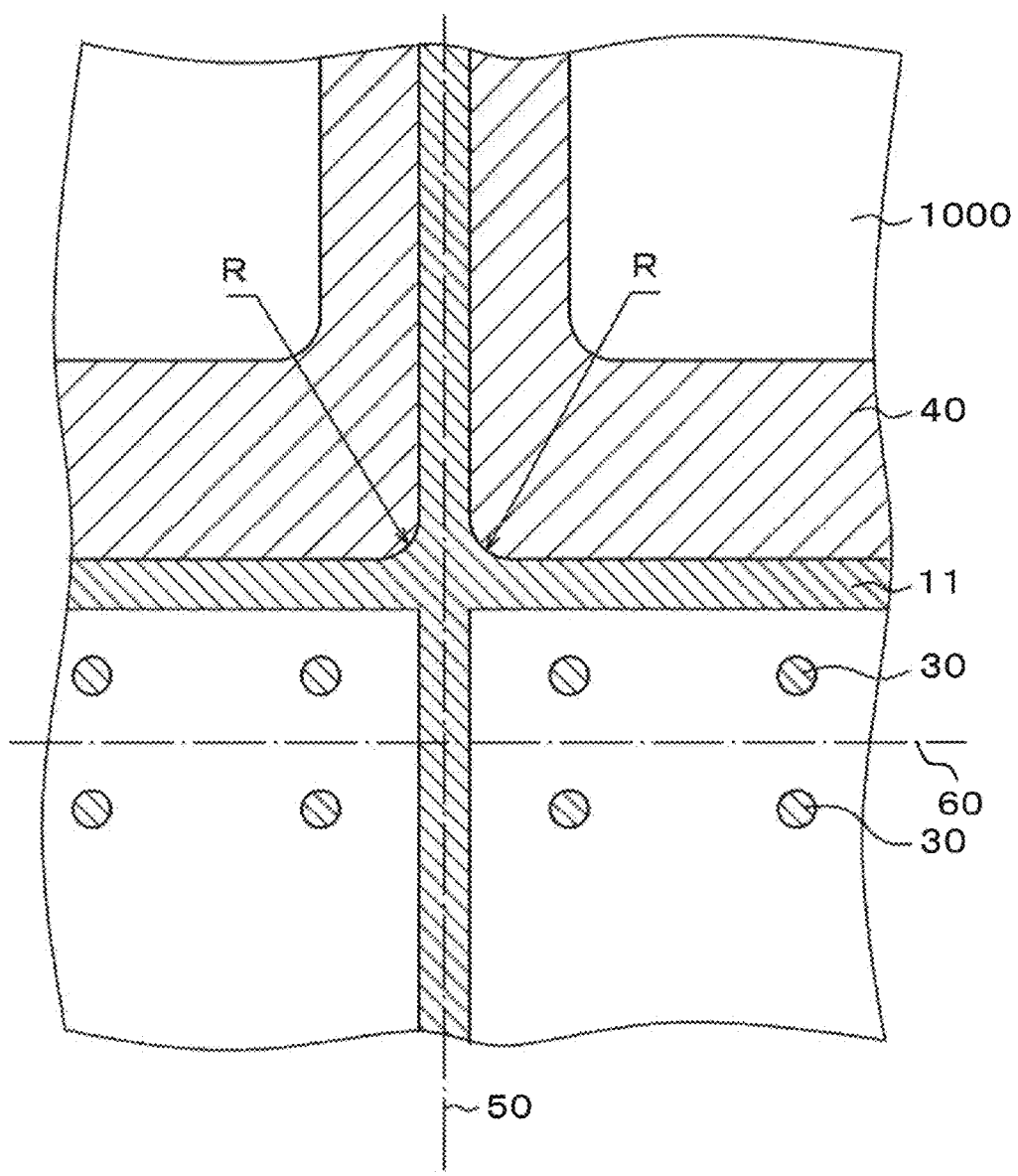
FIG. 18 is another plan view showing the region C of FIG. 5.
Figure 19:
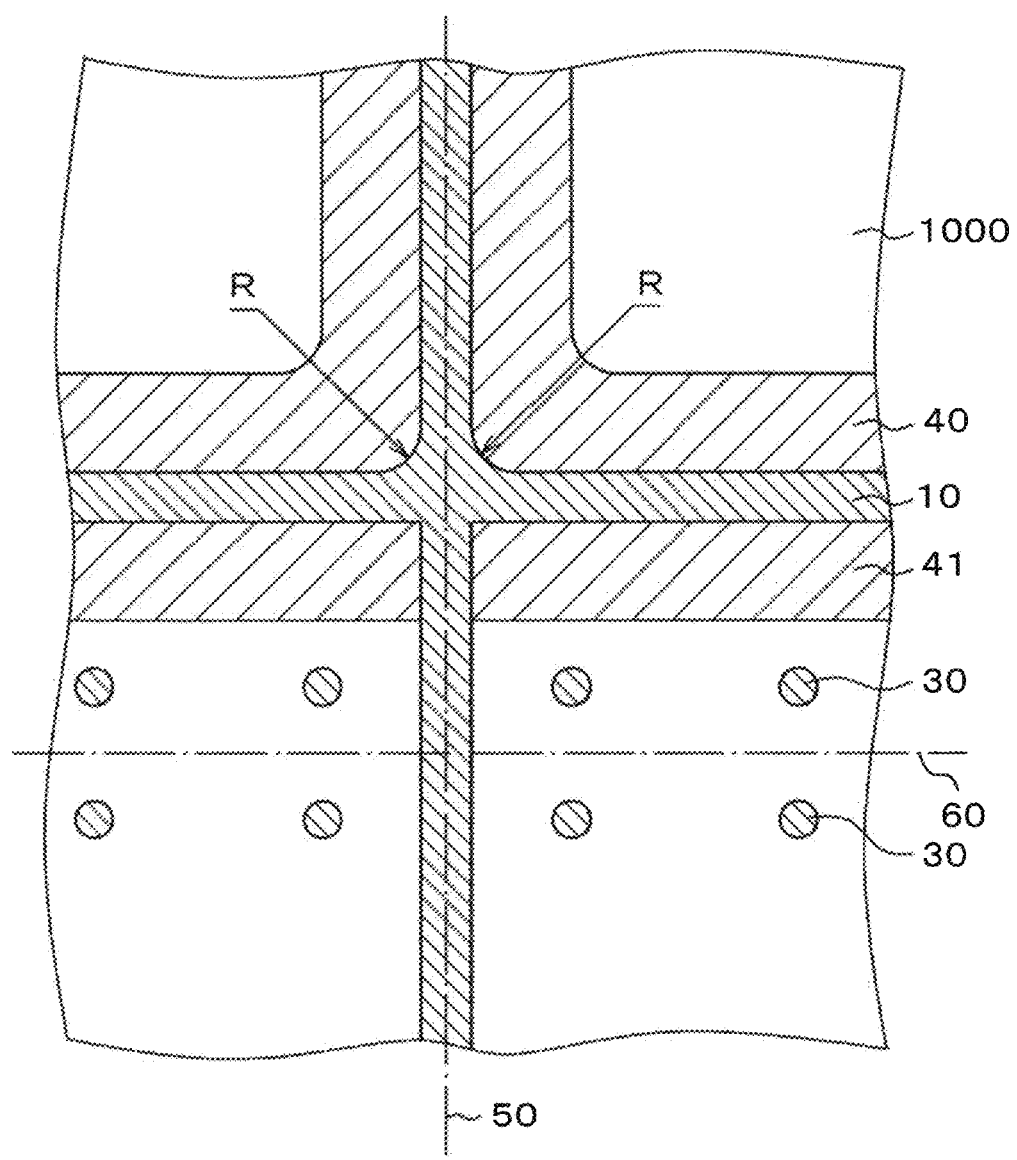
FIG. 19 is still another plan view showing the region C of FIG. 5.
Figure 20:
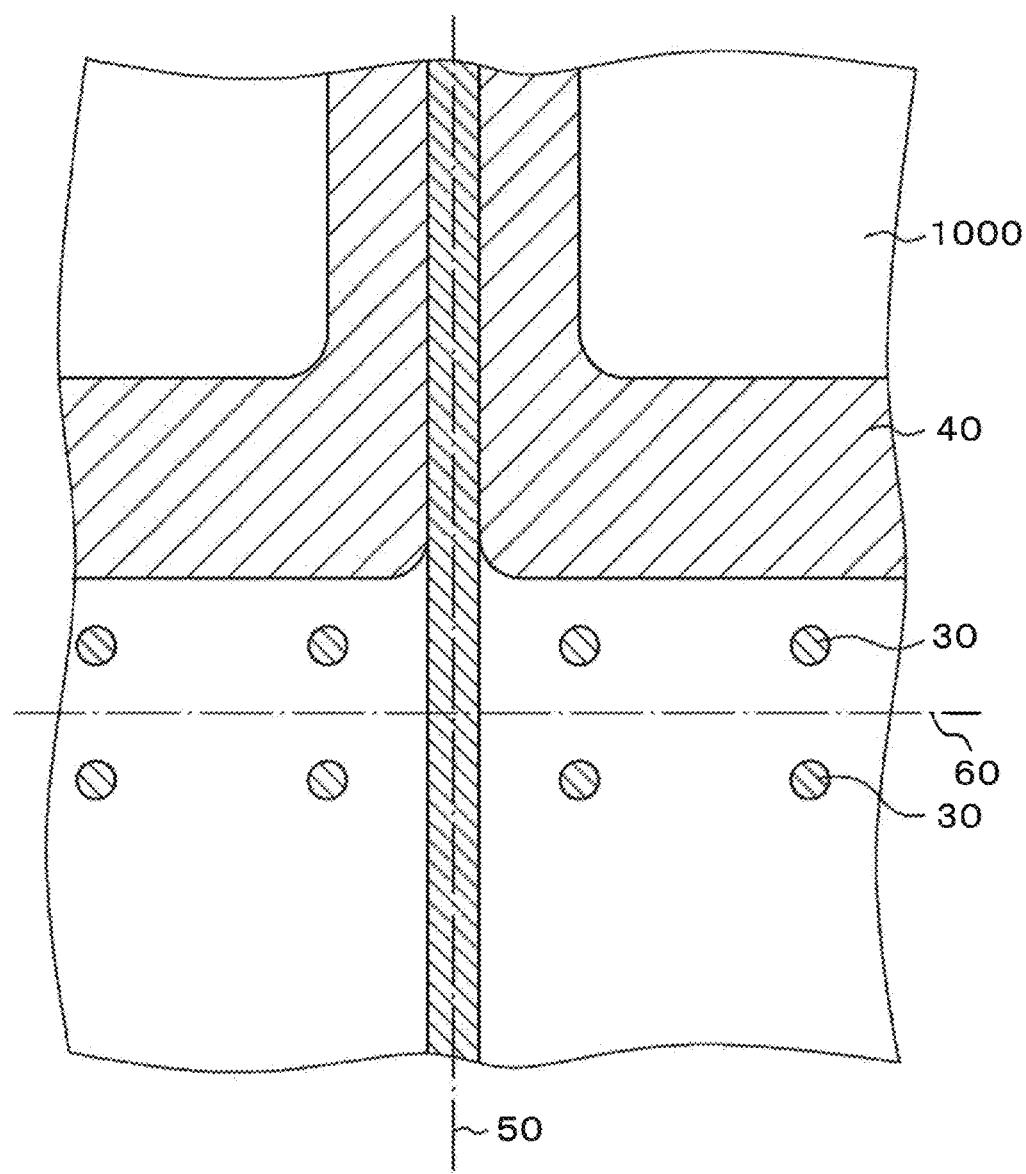
FIG. 20 is still another plan view showing the region C of FIG. 5.

In the foregoing embodiments, the sealant 40, the wall spacer 10, the outer sealant 41, the outer wall spacer 11, and the scribing columnar spacers 30 are sequentially formed from the display region to the terminal portion. The present invention is not limited to this configuration. The wall spacer 10 may be absent as shown in FIG. 18, the outer spacer 11 may be absent as shown in FIG. 19, or neither the wall spacer 10 nor the outer spacer 11 may be provided as shown in FIG. 20. Also in these cases, the sealant near the terminal portion has a larger width than three sides other than the terminal portion. This can obtain an effect for the penetration of a liquid crystal and reduce the width of a seal region near the terminal portion.

The wall spacer 10 and the outer spacer 11 do not always need to be provided on the counter substrate 200. The spacers may be partially or entirely provided on the TFT substrate 100. Moreover, all the spacers do not need to be identical in height and only some of the spacers may be reduced in height. Furthermore, three sides other than the terminal portion 150 are disclosed as identical structures while the terminal portion 150 has a different configuration from the three sides. The present invention is not limited to this configuration. The configuration of the terminal portion 150 may be at least different from those of the two sides adjacent to the terminal portion 150. On the side opposed to the side of the terminal portion 150, all or some of the wall spacer 10, the outer sealant 41, and the outer wall spacer 11 may be provided depending on the configuration of the adjacent liquid crystal display panel. If the terminal portion is formed on two sides, the sides of the terminal portion may have a different configuration from the other side where a terminal portion is not formed.

What is claimed is:

1. A liquid crystal display device comprising,
   a TFT substrate having a display region and a terminal portion,
   a counter substrate,
   a sealant that bonds the TFT substrate and the counter substrate, and
   a liquid crystal sealed inside the sealant,
   wherein
   the sealant has a first sealant and a second sealant, the first sealant is formed in a rectangular shape along the four sides of the counter substrate, the second sealant is formed outside the first sealant and formed only at one of the four sides that extends along the terminal portion,
   a first wall spacer disposed between the first sealant and the second sealant at the one of the four sides, a second wall spacer disposed outside of the second sealant,
   at least two rows of columnar spacers are formed in the first sealant, and
   at least two rows of columnar spacers are formed in the second sealant.

2. The liquid crystal display device according to claim 1, further comprising a plurality of scribing region spacers are formed between the end of the counter substrate and the second wall spacer.

3. The liquid crystal display device according to claim 1, wherein the first wall spacer has an inner corner that is rounded with a curvature radius of at least 0.3 mm.

4. The liquid crystal display device according to claim 1, wherein a color filter layer is formed between the counter substrate and each of the columnar spacers in the first sealant, and between the counter substrate and in the second sealant.

5. A display device comprises: a first substrate including a display region and a terminal region, a second substrate, and a sealant fixing the first substrate and the second substrate, wherein the sealant has a first sealant and a second sealant, the first sealant is formed in a rectangular shape along the four sides of the second substrate, the second sealant is formed outside the first seal and formed only at one of the four sides that extends along the terminal region, a first wall spacer disposed between the first sealant and the second sealant at the one of the four sides, a second wall spacer disposed outside of the second sealant, at least two rows of columnar spacers are formed in the first sealant, and at least two rows of columnar spacers are formed in the second sealant.

6. The liquid crystal display device according to claim 5, further comprising a plurality of scribing region spacers are formed between the end of the second substrate and the second wall spacer in a plan view.

7. The liquid crystal display device according to claim 5, wherein the first wall spacer has an inner corner that is rounded with a curvature radius of at least 0.3 mm.

8. The liquid crystal display device according to claim 5, wherein a color filter layer is formed between the counter substrate and each of the columnar spacers in the first sealant, and between the counter substrate and in the second sealant.

* * * * *